Figure 1:
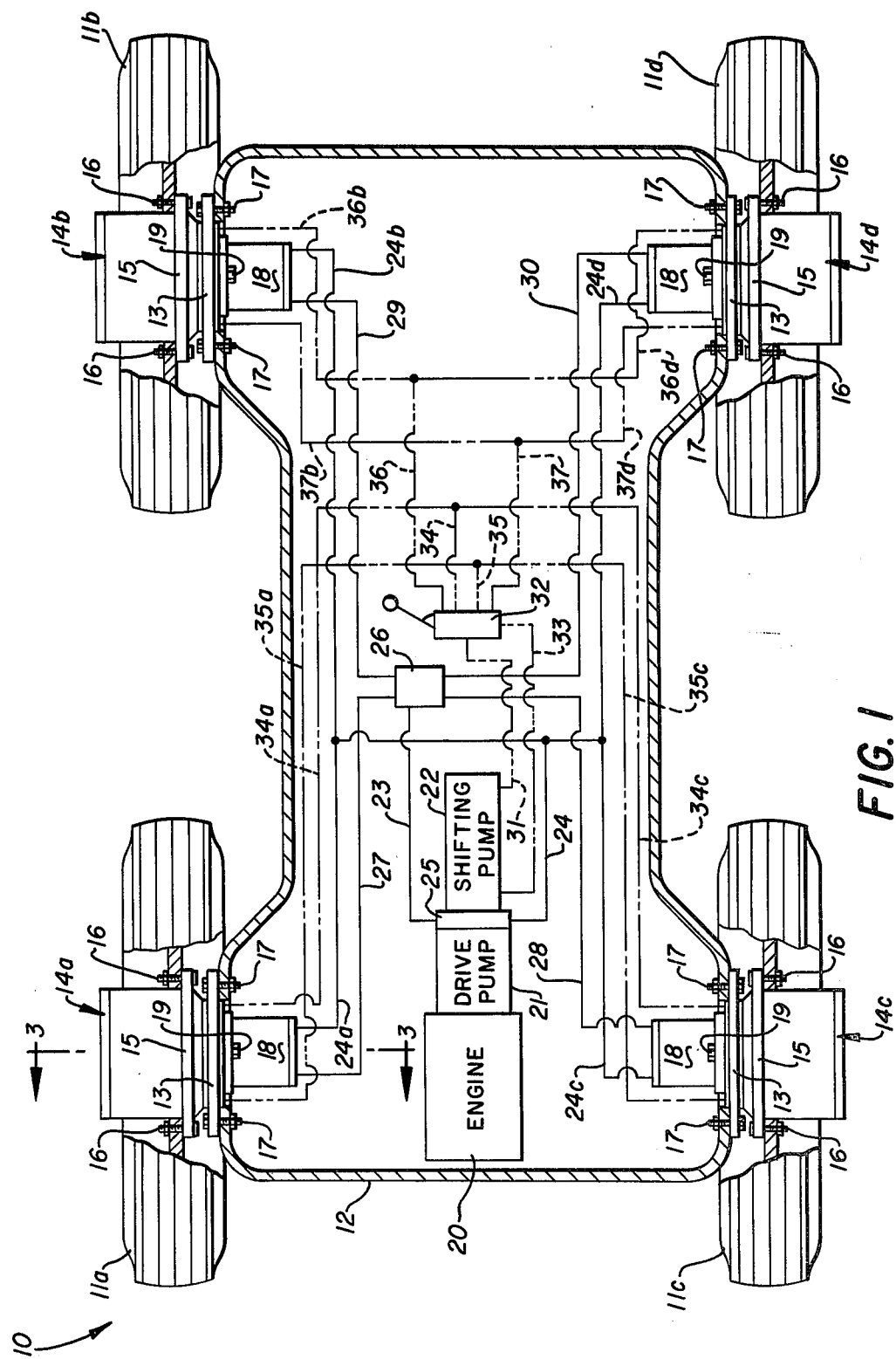

United States Patent [19]

Heitman et al.

[11] 4,162,713

[45] Jul. 31, 1979

[54] PLANETARY TRANSMISSION WITH HYDRAULIC ENGAGEMENT AND DISENGAGEMENT

[75] Inventors: Marshall D. Heitman, Cedar Hill; Joe D. Butler, Houston, both of Tex.

[73] Assignee: Otis Engineering Corporation, Dallas, Tex.

[21] Appl. No.: 892,885

[22] Filed: Apr. 3, 1978

[51] Int. Cl.² .............................................. B60K 7/00
[52] U.S. Cl. ........................................ 180/242; 74/391; 180/308; 180/70 R; 192/3.52; 254/166
[58] Field of Search ............... 180/44 R, 44 F, 42, 180/43, 65 F, 70 R, 66 F; 192/3.52, 85 AA; 254/166; 74/391

[56] References Cited

U.S. PATENT DOCUMENTS

| | | | |
|---|---|---|---|
| 3,468,390 | 9/1969 | Schultz | 180/66 F |
| 3,493,067 | 2/1970 | Rumsey | 180/66 F X |
| 3,770,074 | 11/1973 | Sherman | 180/65 F |
| 3,897,843 | 8/1975 | Hapeman | 180/44 F X |
| 3,969,950 | 7/1976 | Rau | 74/391 |
| 4,043,226 | 8/1977 | Buuck | 74/391 |

FOREIGN PATENT DOCUMENTS

| | | | |
|---|---|---|---|
| 1806022 | 5/1970 | Fed. Rep. of Germany | 180/66 F |
| 79251 | 10/1962 | France | 180/65 F |

*Primary Examiner*—Robert G. Sheridan
*Assistant Examiner*—Terrance L. Siemens
*Attorney, Agent, or Firm*—Warren H. Kintzinger

[57] ABSTRACT

A hydraulically operated planetary transmission and motor assembly mounted on the hub of two or more wheels of a four wheeled vehicle for providing wheel driving torque with the transmission set in drive. In an alternate form, the transmission and motor assembly is mounted on the hub of a winch to provide the power drive. The transmission is hydraulically engageable and disengageable and includes a lock whereby the transmission can be locked in either the engaged or disengaged position. The arrangement of components provides easy access for maintenance and for change out of gears to gear sets having different gear ratios all within the same transmission housing.

41 Claims, 6 Drawing Figures

PLANETARY TRANSMISSION WITH HYDRAULIC ENGAGEMENT AND DISENGAGEMENT

This invention relates to transmission and motor drive assemblies and more particularly, to a planetary transmission and motor assembly suitable for mounting at the hub of a vehicle wheel to supply drive power therefore, in assemblies falling generally in a category known as wheel motors. The wheel motor transmission assembly may be employed as the drive unit for a two or four wheel drive vehicle and in an alternate form may be employed as the source of drive power for a winch in which case, at least one motor transmission assembly, preferably two motor transmission assemblies, is mounted on the hub axis of the winch.

In prior devices of the wheel motor type, ease of maintenance and, in particular, ease of disassembly for maintenance purposes, has been a problem. Applicant's transmission and wheel motor combination is designed such that the motor and major portions of the transmission can be disengaged and removed from the vehicle without requiring that the vehicle be jacked up or placed on a vehicle lift. This avoids increasing the "down time" for a vehicle where a vehicle must be jacked up or on a lift, and decreases the time in which it is not in operation due to maintenance and repair.

It is therefore a principal object of this invention to provide a wheel motor transmission assembly which can be easily maintained.

Another object is to provide a wheel motor transmission assembly which provides easy access to integral parts thereof.

A further object of this invention is to provide a wheel motor transmission assembly whose ease of maintenance reduces the down time or inoperative time for the vehicle in which it is employed.

Still another object is to provide for free wheeling of transmissions without the transmission gears meshing, or being driven, such as would facilitate the towing of a vehicle, or free play out of a net from a fishing vessel.

Features of this invention include: a planetary transmission and motor assembly mounted in the hubs of two or four wheels in a four-wheeled vehicle. These transmission and motor assemblies are designed such that the motor and principle portions of the transmission can be removed from the hub of the wheel without jacking the wheel off the ground or placing the vehicle on a vehicle lift. Where multiple wheel motor units are employed as in the four-wheeled drive vehicle having four wheel motor transmission combinations, one in each wheel, two of the transmissions can be disengaged to provide a two-wheel drive vehicle. In such a state, the two-wheeled drive can move the vehicle at twice the speed. The wheel motor transmission combination is provided with a hydraulic engage and disengage mechanism and the transmission can be locked in either the engaged or disengaged position. In an alternate form of the invention, the planetary transmission and motor combination or preferably two of them, are mounted to the hub of a winch to provide the power drive therefore.

Figure 2:
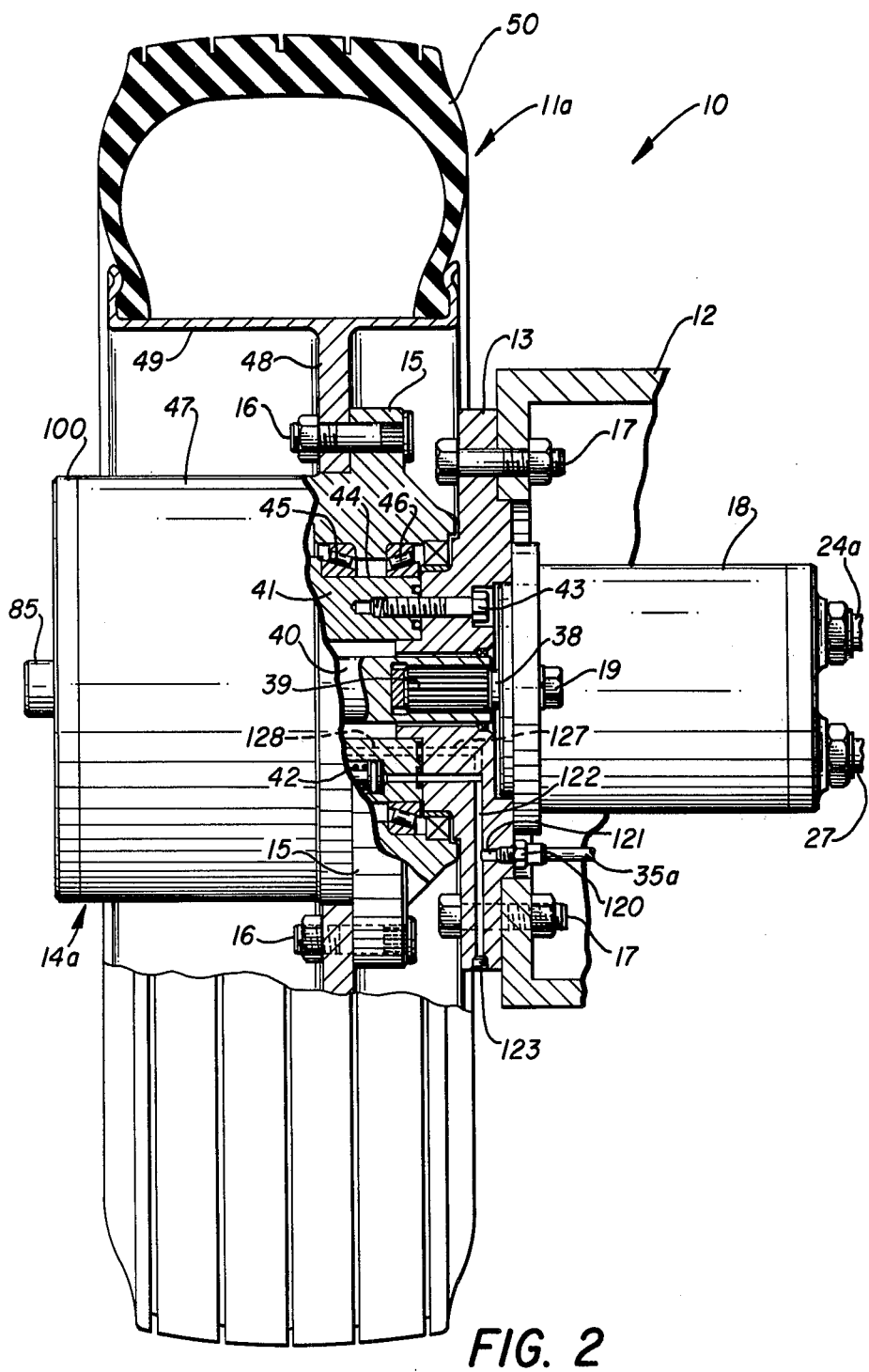
Figure 3:
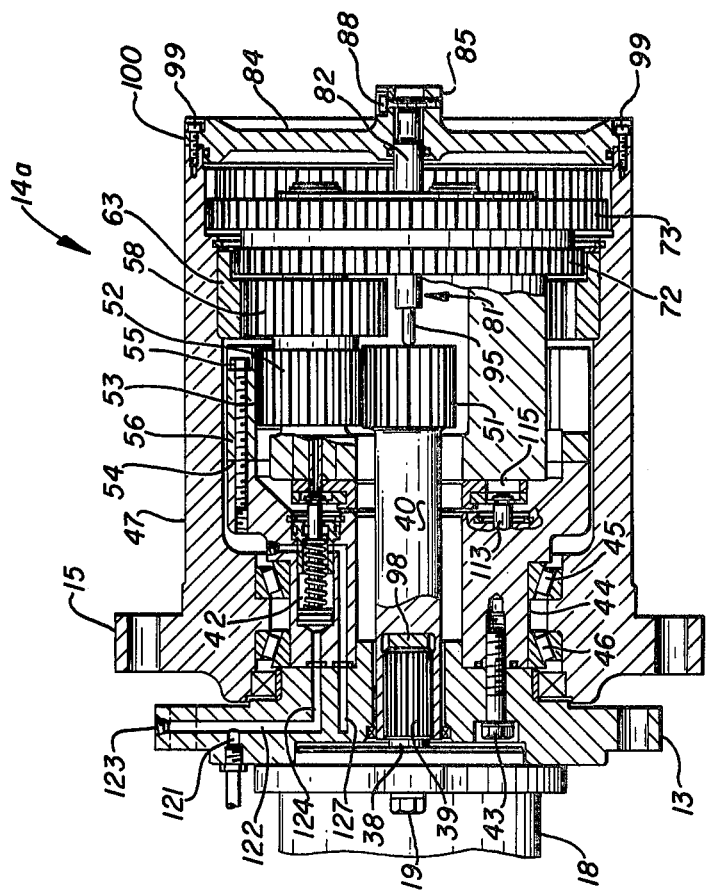
Figure 4:
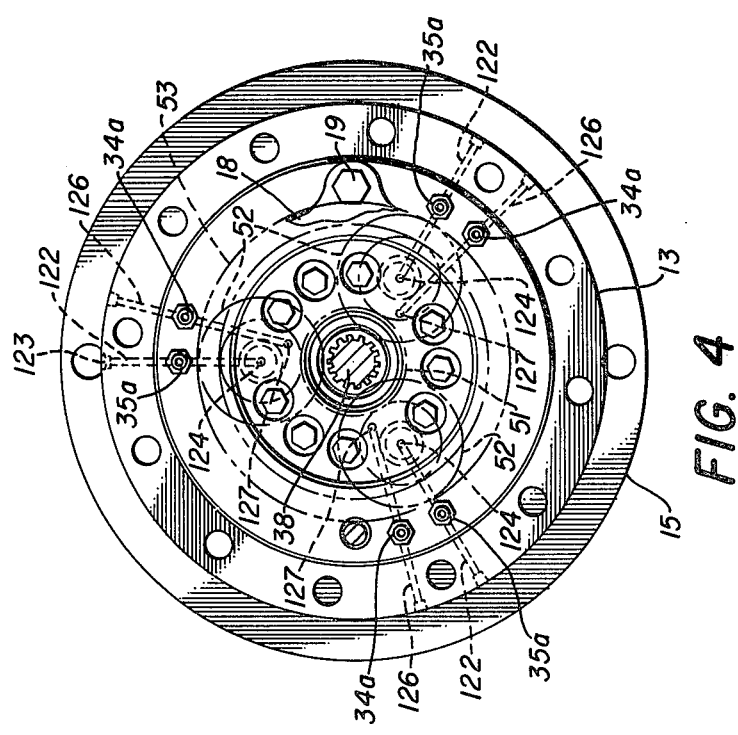
Figure 5:
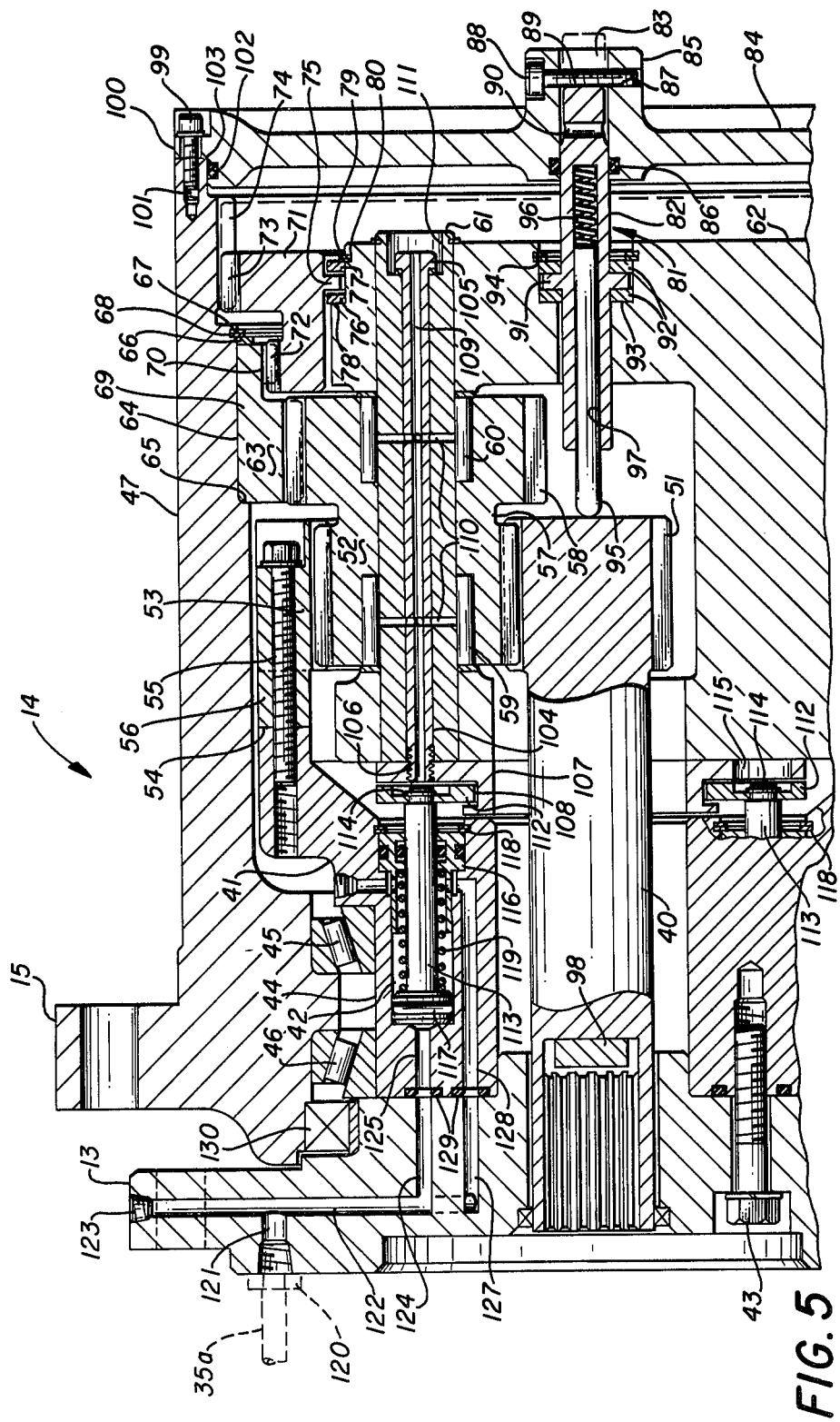
Figure 6:
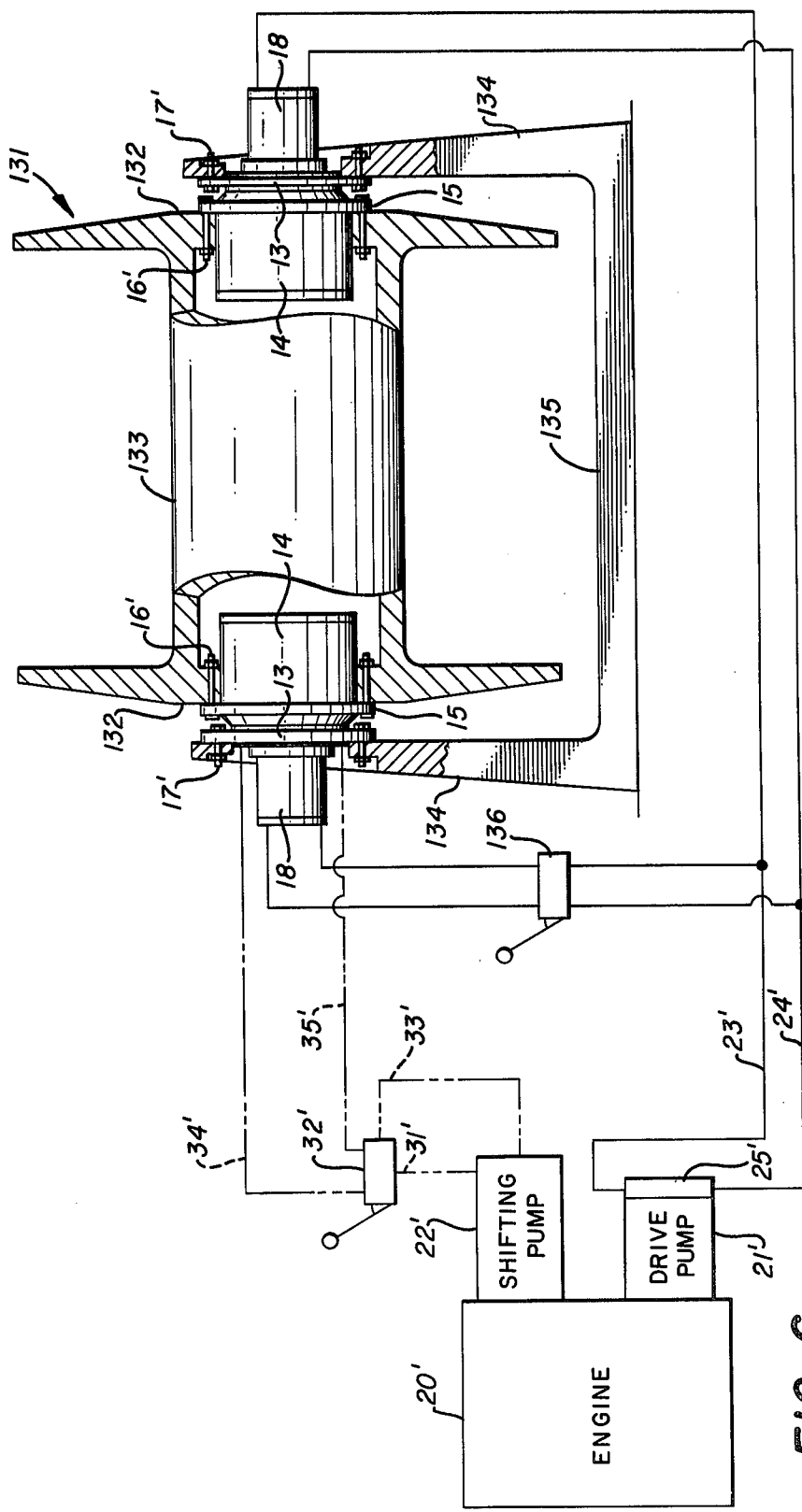

A specific embodiment representing what is presently regarded as the best mode of carrying out the invention is illustrated in the accompanying drawings wherein:

FIG. 1 is a plan view, partly sectional and partly schematic, with portions broken away of a four-wheeled vehicle employing a hydraulically operated wheel motor transmission assembly;

FIG. 2, a partially broken away and sectioned view showing a wheel motor transmission assembly according to this invention;

FIG. 3, a view along line 3—3 of FIG. 1 showing a sectional view of a transmission employed in the wheel motor transmission assembly of this invention;

FIG. 4, an end elevation of FIG. 3 with the motor partially removed showing in end view a flange member and the transmission according to this invention;

FIG. 5, an enlarged broken away view of a portion of the transmission shown in FIG. 3 according to this invention; and, FIG. 6, a schematic view, partially in section, of a winch drive with hydraulic motor and planetary transmission assemblies mounted therein according to an alternate form of this invention.

Referring to the drawings:

FIG. 1 shows a four wheel drive vehicle 10 with wheels 11a, 11b, 11c, and 11d rotatably mounted on vehicle frame 12 via flange members 13 that individually rotatably mount integral transmission and wheel hub units 14a, 14b, 14c, and 14d each having a hub flange 15 on which a wheel is mounted by bolts 16. Flange members 13 are mounted on vehicle frame 12 at each location by bolts 17. Wheel motors 18, indicated as being hydraulic drive motors although they could be electric motors as may be desired in some applications, are mounted to the vehicle inboard side of respective wheel mounting flanges 13, with screws 19 (or bolts) through a motor flange into a flange 13.

The motors 18 in the drive motors and for vehicle 10 are depicted as being hydraulic drive motors and the transmissions 14 (as a matter of description convenience location letter designation will be dropped when referring generally to a transmission, the mounting, and drive connection with a drive motor) are hydraulically shift controllable for drive or non-drive. A vehicle drive and drive control system, shown schematically and mounted on frame 12, includes an engine 20 providing drive power to a drive pump 21 and a shifting fluid power pump 22. Drive pump 21 circulates fluid under pressure outward through line 23, or outward through line 24 when flow direction reversing valve 25 is reversed, to flow divider and control valve 26 that may be controlled to divide drive fluid flow under pressure to all four lines 27, 28, 29 and 30, to only two of lines 27 and 28 for front wheel drive or to lines 29 and 30 for rear wheel drive. With flow divider and control valve 26 set for two wheel drive, the same fluid volume delivery as used for four wheel drive moves the vehicle substantially twice as fast. Hydraulic drive fluid is returned from drive motors 18 through line branches 24a, 24b, 24c and 24d, and line 24. Shifting fluid power pump 22 has a pressure fluid output line 31 connection to shift valve 32 and a shifting fluid return line 33 connection from valve 32 back to pump 22. Shift valve 32 acts through lines 34 having line branches 34a and 34c, 35 with branches 35a and 35c, 36 with branches 36b and 36d, and 37 with branches 37b and 37d to hydraulic pressure engage and disengage respective transmissions 14a, 14b, 14c, and 14d that may free wheel without the gears rotating in the disengaged state.

Referring also to FIG. 2 the wheel motor 18 has an output shaft 38, with splines 39, in driving engagement with transmission input shaft 40. A transmission engage and disengage member 41 with three double acting power cylinders 42 is mounted in fixed non-rotative position on flange member 13 by bolts 43 that extend through the flange member 13 and into transmission member 41. Transmission member 41 has a cylindrical surface 44 mounting roller thrust wheel bearings 45 and 46 that are contained within transmission housing 47 that also functions as a wheel hub with hub flange 15. The wheel web 48, that extends to wheel rim 49 mounting tire 50, is mounted on housing 47 and to hub flange 15 by wheel bolts 16. With reference also to FIGS. 3, 4 and 5, transmission input shaft 40 extends to and is formed with a transmission sun gear 51 in drive engagement with and supported by three rotationally related planetary gears 52 (indicated in invisible dotted lines in FIG. 4) that are in turn in engagement with and supported by fixed position ring gear 53. Ring gear 53 is fixed in position in being mounted on annular shoulder 54 of transmission engage and disengage member 41 by bolts 55 that extend through the base rim 56 of the ring gear 53 into the shoulder 54. It should be noted that the teeth of sun gear 51, planetary gears 52, and ring gear 53 are all straight teeth in order to facilitate axial shifting of the planetary gears 52 back and forth as the transmission is shifted back and forth between the drive engaged and disengaged states. Each planetary gear 52 is part of a compound gear structure 57 formed with a companion planetary gear 58 that together are rotatably mounted by roller bearings 59 and 60 on one of three gear spindles 61 in an axially shiftable planetary gear carrier 62. The planetary gears 58 are in driving engagement with teeth of ring gear 63 the teeth of which are straight teeth to facilitate axial shifting of the planetary gear carrier 62 and the planetary gears 58 in shifting between drive engaged and disengaged states. Ring gear 63, a loose sliding fit in bore 64 of housing 47, is axially confined between housing shoulder 65 and a thrust bearing ring 66 supported in place by a retainer ring 67 held in housing groove 68. The ring gear 63 has an axial extension 69 equipped with clutch teeth 70 that are on a greater diameter than ring gear 63 in order that the teeth 70 be clear of contact with planetary gears 58 as the transmission is shifted from the drive engaged to the drive disengaged state. Annular clutch member 71 is equipped with clutch teeth 72 that are shiftable into and out of engagement with clutch teeth 70, and also with a tooth ring 73 that engages housing teeth 74 in an axially slidable spline type interconnection. The annular clutch member 71 is equipped with an inner radial ridge 75 confined between thrust rings 76 and 77 axially supported in place by carrier shoulder 78 and retainer ring 79 in groove 80.

The planetary gear carrier 62 with annular clutch member 71 thereon is shown in FIGS. 3 and 5 to be restrained in the drive engaged shifted state by fail safe lockout device 81. Device 81 includes a rod portion 82 that is an axially movable sliding fit in opening 83 of transmission outer end enclosure cover 84. Opening 83 extends through cover boss 85, includes an "O" ring seal 86 to prevent loss of transmission oil and a threaded hole 87 in the boss 85 for holding shift position lock bolt 88 in the state shown restraining the end 89 of lockout device rod 82 for transmission lock to the drive engaged state. A through hole 90 is provided in rod 82 through which the bolt 88 may be placed for locking the lockout device 81 and transmission in the non-drive state. Device 81 also includes an annular ridge 91, on rod 82, that is axially confined in planetary gear carrier 62 for movement with the carrier by two thrust washers 92, shoulder 93 and snap ring 94. Thus, if bolt 88 is removed and device 81 free to move, with shifting movement of the carrier 62, the end 89 of lockout device rod 82 may be used as a visual indicator of the shifted state of the transmission 14. The lockout device 81 also functions as a holder for a bias pin 95 backed by resiliently compressed coil spring 96 contained within bore 97 of the device 81 within which the bias pin 95 is a sliding fit. The bias pin 95 as backed by spring 96, regardless of the shifted position of the planetary gear carrier 62 and device 81, continually biases the sun gear 51 and its shaft 40 for continued splined engagement with the motor output shaft 38 as positioned with thrust pad 98 engagement with the end of shaft 38.

Transmission cover 84 is fastened on the outer end of transmission housing 47 by a ring of bolts 99 extended through cover flange 100 and into threaded bolt holes 101 in housing 47 and "O" ring 102 in the cover-housing bore 103 structure is an effective oil seal for the transmission enclosure. Each gear spindle 61 has a through bolt 104 that extends through from bolt head 105 to a threaded interconnection 106 with annular shift ring 107 shaped with an annular shifting groove 108. The through bolts 104 have oil supply openings 109 that are in fluid communication with spindle openings 110 to supply oil to roller bearings 59 and 60. Bolt heads 105 are readily accessible in spindle recesses 111 for threaded assembly and disassembly from shift ring 107 for assembly into or disassembly removal when transmission cover 84 is removed for easy removal of the planetary gear structure 57 and planetary gear carrier 62 along with clutch member 71 from the transmission housing 47. Individual shift collar elements 112, that are individually retained on the output shafts 113 of power cylinders 42 by snap rings 114, are accessible for removal by rotation of annular shift ring 107 to successive alignment of snap ring access opening 115 with shafts 113 and removal of snap rings 114. Output shafts 113 each extend through a cylinder output end closure and sealing structure 116 to connection with the double acting piston 117 of the respective power cylinder 42 with each structure 116 held in place by a snap ring 118 that may be removed for disassembly of the power cylinders 42. Coil springs 119 within cylinders 42 resiliently bias the pistons 117 and the planetary carrier 62 from the disengaged state to the engaged state with enough force to overcome the resistive resilient force of spring 96 and achieve and maintain transmission clutched engagement when there is no disengagement fluid pressure activation of the cylinders 42.

Shifting fluid pressure is applied through line 35a, fitting 120, line 121, line 122 closed at the outer end by plug 123, and line 124 in flange member 13, and through line 125 in transmission member 41 to the disengage activation chamber, in parallel, of power cylinders 42. In like manner, fluid pressure is applied through line 34a to line 126 and line 127, to and through line 128 in transmission member 41 to the engage activation chamber, in parallel, of power cylinders 42. "O" ring seals 129 are employed to seal the lines from fluid loss at the interconnection of lines 124 and 125, and 127 and 128. Further, oil seal 130 is provided between flange member 13 and transmission housing 47 to prevent loss of transmission oil. With respect to the shifting elements, the individual shift collar elements 112 that engage annular shifting groove 108 of annular shift ring 107 are maintained in shifting aligned engagement therewith as arcuate collar elements by contact with the groove. It should be noted, however, that the annular shifting ring 107 could instead be three segments engaged by an annular shift ring mounted on the three power cylinder output shafts 113 in place of collar elements 112. Disassembly with such a shifting element structure would be through unthreading bolts 104 and then, after removal of the carrier 62, removal of the segments by moving them radially inward to clear the annular shift ring and then axially outward from the housing 47. The structure is such in vehicle wheel drives that the motor of each wheel is inboard of the wheel and the transmission 14 primarily outboard of the wheel hub mounting. It is a transmission structure such as to permit complete disassembly of the gears up to and including the sun gear shaft and shift power cylinder pistons and output shafts from a transmission with the vehicle wheel on the ground and not dismounting the wheel. With such disassemblies and reassemblies, the transmission housing 47 remains in place and at least seven gear change outs are provided with gear ratios respectively:

22.5 to 1
29.394 to 1
43.846 to 1
56 to 1
64 to 1
70.4 to 1
94.286 to 1

Such transmission gear ratio change out flexibility is very useful in vehicles for many tasks in a structurally balanced transmission constituting a significant advance in power system drive transmissions.

Referring now to FIG. 6, a winch 131 and winch drive system is shown with two of the motor 18-transmission 14 combinations used, one combination at each end of the winch 131. With winch 131, however, the units are mounted with the transmissions 14 primarily inboard within the hub ends 132 of the winch drum 133 with bolts 16' extended through each hub flange 15 and the respective hub end 132. The flange members 13 are mounted on vertically extended drum end mount supports 134 of mount structure 135 with bolts 17'. Here again, as with the vehicle system, the motors 18 are depicted as being hydraulic drive motors and the transmissions 14 are hydraulically shift controllable for winch drive or non-drive. The winch 131 drive and drive control system, shown schematically, includes an engine 20' providing drive power to a drive pump 21' and a shifting fluid power pump 22'. Drive pump 21' circulates fluid under pressure outward through line 23', or outward through line 24' when flow direction reversing valve 25' is reversed, with the lines 23' and 24' directly connected to one motor 18 and through isolation valve 136 to the other motor 18. Thus, one or both motors 18 may be driven obtaining substantially twice the winch drum drive speed with one motor being driven for a given flow rate of fluid under pressure from drive pump 21'. Further, the direction of winch rotation is reversed by motor 18 drive reverse as controlled by flow direction reversing valve 25'. Shifting fluid power pump 22' has a pressure fluid output line 31' connection to shift valve 32' and a shifting fluid return line 33' connection from valve 32' back to pump 22'. Shift valve 32' acts through lines 34' and 35' to hydraulic pressure engage and disengage one of the transmissions 14 for two motor and single motor drive respectively. Although not shown in FIG. 6 for the right hand motor 18-transmission 14 combination the shifting fluid pump 22', output line 31', shift valve 32' and return line 33' could be duplicated, and the isolation valve 136 also be duplicated in the fluid lines to the right hand motor 18 for more control versatility of winch drive. With both winch drive motors 18 shut off by valves to non-drive and the transmissions 14 shifted to disengage the transmission outputs, the winch may free wheel such as desired for free play out of a fishing net from a fishing vessel without transmission gears meshing in non-drive idling, or being driven.

Whereas this invention is herein illustrated and described with respect to several embodiments hereof, it should be realized that various changes may be made without departing from essential contributions to the art made by the teachings hereof.

We claim:

1. In a planetary transmission shiftable between drive engaged and drive disengaged states: power shift means with transmission shift output means; a transmission housing rotatably mounted on said power shift means; drive power input means adapted for drive power input from a first end of said transmission; a removable cover on a second end of said transmission; sun gear means drive connected to said drive power input means; a planetary carrier; planetary gear means rotatably mounted in said planetary carrier, and with said planetary carrier rotatably mounted within said transmission housing; first ring gear means non-rotatably mounted on said power shift means; second ring gear means rotatably mounted within said transmission housing; said planetary gear means driven by said sun gear means and in meshed engagement with both said first and second ring gears; ring gear clutch means; clutch means non-rotatably mounted by said transmission housing shiftable into and out of clutched engagement with said ring gear clutch means; and axially shiftable transmission means interconnecting shift output means of said power shift means and said clutch means non-rotatably mounted by said transmission housing.

2. The planetary transmission of claim 1, wherein said planetary gear means is in the form of three substantially identical planetary gear units each individually rotationally mounted on a spindle of three substantially identical planetary gear mounting spindles mounted in said planetary carrier in substantially equal spacing about the carrier.

3. The planetary transmission of claim 2, wherein each planetary gear unit is a compound gear having a first gear section engaging said sun gear and said first ring gear, and a second gear section engaging said second ring gear.

4. The planetary transmission of claim 3, wherein said clutch means non-rotatably mounted by said transmission housing is provided with interconnect means to said planetary carrier allowing relative rotation between said clutch means and said planetary carrier, and limiting relative axial movement between said clutch means and said planetary carrier for clutch shifting movement of said clutch means with said planetary carrier; said planetary carrier being mounted for axial clutching movement within said transmission housing; and shift yoke interconnect means interconnecting said planetary carrier and the transmission shift output means of said power shift means.

5. The planetary transmission of claim 4, wherein said power shift means includes fluid power cylinder means containing double acting piston means subject to fluid pressure driven axial movement between cylinder structure limits in opposite directions as determined by the application of fluid pressure to a first end of said fluid power cylinder means or the second end of the cylinder means; said shift means is in the form of a fixed position housing shaped with said fluid power cylinder means and mounted on a mounting member as by bolts; first fluid pressure passage means in said fixed position housing connected to the first end of said cylinder means and second fluid pressure passage means connected to the second end of said cylinder means; first and second fluid pressure passage means in said mounting means in fluid pressure communication with said first and second fluid pressure passage means in said fixed position housing; and said transmission shift output means is piston shaft means output connected to clutch collar means connected to said axially shiftable transmission means.

6. The planetary transmission of claim 5, wherein said axially shiftable transmission means includes said planetary carrier; and through bolts extended through each of said planetary gear mounting spindles and threadingly connected to a shift ring of said clutch collar means.

7. The planetary transmission of claim 6, wherein said fluid power cylinder means is a plurality of fluid power cylinders.

8. The planetary transmission of claim 7, wherein said fluid power cylinders are substantially equally spaced circumferentially about said fixed position housing; and shift collar element means mounted on the output end of each piston shaft means engages an annular groove in the shift ring of said clutch collar means.

9. The planetary transmission of claim 8, wherein said shift collar element means is in the form of a collar element disengagably mounted on the output end of each piston shaft means by snap ring means; and access opening means in said shift ring radially positioned in said shift ring to be positionable with rotational positioning of said shift ring to successive alignment with said plurality of fluid power cylinders for snap ring dismounting or mounting of said collar elements.

10. The planetary transmission of claim 8, wherein each of said fluid power cylinders includes resiliently compressed spring means contained in the second end of the cylinder means exerting resilient biasing force on respective piston means in the direction of transmission engagement.

11. The planetary transmission of claim 8, wherein teeth of said sun gear, teeth of said planetary gear unit, and said first and second ring gears are straight teeth substantially aligned with the axis of shifting movement of said planetary carrier to facilitate shifting of the transmission between engaged and disengaged states.

12. The planetary transmission of claim 11, wherein said second ring gear includes an annular ring of clutch spline teeth; said housing includes an internal ring of spline teeth; said clutch means has a ring of spline teeth engaging the internal ring of spline teeth of said housing; with said spline teeth straight axially aligned teeth to facilitate axial shifting movement of said clutch means between transmission engaged and disengaged states; and clutch spline teeth on said clutch means engageable and disengageable with the annular ring of clutch spline teeth of said second ring gear.

13. The planetary transmission of claim 12, wherein said clutch means is retained on said planetary carrier by shoulder and snap ring means.

14. The planetary transmission of claim 12, wherein assembly and disassembly connection and retaining means are positioned for assembly and disassembly of said clutch means and said gears to within and from said transmission housing when said removable cover is removed through the open housing at the second end of said transmission.

15. The planetary transmission of claim 12, wherein said transmission housing is rotatably mounted on said power shift means by roller thrust bearing means on a cylindrical portion of said power shift means adjacent said first end of said transmission; said power shift means has a center opening; said sun gear having an input shaft extending through the center opening of said power shift means when assembled in place in the transmission; said sun gear input shaft having a splined section for drive engagement with and support by a splined power shaft; and with the sun gear also supported by meshed engagement with the three planetary gear units.

16. The planetary transmission of claim 15, wherein said power shift means includes an annular shoulder; and non-rotatable mounting of said first ring gear means on the annular shoulder by bolts extended through said first ring gear means and threaded into said annular shoulder with bolt heads facing the removable cover second end of said transmission.

17. The planetary transmission of claim 15, wherein axially directed resilient spring bias means is positioned with resilient spring biasing force contact with said sun gear urging the sun gear and sun gear input shaft toward the first end of said transmission and toward full drive engagement with a splined power shaft.

18. The planetary transmission of claim 17, wherein said axially directed spring bias means is a rod backed by a resiliently compressed spring contained within a cylindrical structure mounted in the transmission, and with the rod supported by and guided by said cylindrical structure for end spring biased engagement with an end of the sun gear and sun gear input shaft.

19. The planetary transmission of claim 18, wherein said cylindrical structure is part of a transmission shifted state locking device.

20. The planetary transmission of claim 19, wherein said transmission shifted state locking device is formed with a rod portion that is an axial movement directed sliding fit in an opening of the transmission's removable cover; interconnect means interconnecting said planetary gear carrier and said locking device permitting relative rotation between carrier and locking device, while carrying the locking device in axial movement with the carrier as the gear carrier is shifted axially between transmission engaged and disengaged states; hole means in said rod portion; lock member opening means in said removable cover; and a locking member insertable in said lock member opening means in said cover and in contact with the outside end of said rod portion for locking the transmission in the drive engaged state, and insertable in said lock member opening means in said cover and in said hole means in said rod portion for locking the transmission in the drive disengaged state.

21. The planetary transmission of claim 20, wherein the rod portion of said shifted state locking device has an outside end, and the cover and the opening of the transmission removable cover are dimensioned to provide a visual indication of the shifted state of the transmission with the rod outside end contained within the opening of the cover with the transmission in the drive engaged state, and with the rod and rod outside end extending out of the cover opening to the exterior of the cover with the transmission in the drive disengaged state.

22. The planetary transmission of claim 15, wherein said mounting member is provided with mounting bolt holes in a mounting flange of said mounting member for mounting of the transmission on a mounting frame; shift fluid lines of a transmission shift control system are connected to said first and second fluid pressure passage means in said mounting member; and a drive motor having a splined output shaft is mounted on said mounting member as by bolts with said splined output shaft in driving engagement with the splined section of said sun gear input shaft.

23. The planetary transmission of claim 22, wherein said drive motor is a hydraulic drive motor; and a combined hydraulic fluid power and reverse control system is connected to said hydraulic drive motor.

24. The planetary transmission of claim 23, wherein the transmission housing includes a wheel mounting flange having bolt holes for the mounting of a vehicle wheel; wherein a plurality of said transmission and drive motor assemblies are mounted on said mounting frame in the form of a vehicle frame; with the transmissions primarily outboard of wheels mounted on the transmission housings; and with the drive motor of each transmission and drive motor assembly inboard of the wheel mounted on the transmission housing.

25. The planetary transmission of claim 24, wherein selective fluid power control means is provided for driving selected transmissions and wheels of the vehicle.

26. The planetary transmission of claim 25, wherein shift control means and selective fluid power control means are located in a vehicle for operation by one operator.

27. The planetary transmission of claim 23, wherein the transmission housing includes a drive output connection flange having bolt holes; a mounting of transmission and drive motor assemblies to opposite ends of the hub of winch by bolt connection of said housing drive output connection flanges to opposite ends of the winch hub; extension of the transmission housings to the interior of the winch hub; and with the drive motor of each transmission and drive motor assembly outboard of the winch hub.

28. The planetary transmission of claim 27, wherein selective fluid power control means is provided for driving selectively one or both transmissions and drive motor assemblies for increased winch hub drive torque and speed versatility.

29. The planetary transmission of claim 28, wherein shift control means and selective fluid power control means are mounted for operation by one operator.

30. The planetary transmission of claim 1, wherein said clutch means non-rotatably mounted by said transmission housing is provided with interconnect means to said planetary carrier allowing relative rotation between said clutch means and said planetary carrier, and limiting relative axial movement between said clutch means and said planetary carrier for clutch shifting movement of said clutch means with said planetary carrier; said planetary carrier being mounted for axial clutching movement within said transmission housing; and shift yoke interconnect means interconnecting said planetary carrier and the transmission shift output means of said power shift means.

31. The planetary transmission of claim 30, wherein said power shift means includes fluid power cylinder means containing double acting piston means subject to fluid pressure driven axial movement between cylinder structure limits in opposite directions as determined by the application of fluid pressure to a first end of said fluid power cylinder means or the second end of the cylinder means; said shift means is in the form of a fixed position housing shaped with said fluid power cylinder means and mounted on a mounting member as by bolts; first fluid pressure passage means in said fixed position housing connected to the first end of said cylinder means and second fluid pressure passage means connected to the second end of said cylinder means; first and second fluid pressure passage means in said mounting means in fluid pressure communication with said first and second fluid pressure passage means in said fixed position housing; and said transmission shift output means is piston shaft means output connected to clutch collar means connected to said axially shiftable transmission means.

32. The planetary transmission of claim 31, wherein said axially shiftable transmission means includes said planetary carrier; and through bolt means extends through planetary gear mounting spindle means and threadingly connected to a shift ring of said clutch collar means.

33. The planetary transmission of claim 32, wherein said fluid power cylinder means is a plurality of fluid power cylinders.

34. The planetary transmission of claim 33, wherein said fluid power cylinders are substantially equally spaced circumferentially about said fixed position housing; and shift collar element means mounted on the output end of each piston shaft means engages an annular groove in the shift ring of said clutch collar means.

35. The planetary transmission of claim 34, wherein said shift collar element means is in the form of a collar element disengagably mounted on the output end of each piston shaft means by snap ring means; and access opening means in said shift ring radially positioned in said shift ring to be positionable with rotational positioning of said shift ring to successive alignment with said plurality of fluid power cylinders for snap ring dismounting or mounting of said collar elements.

36. The planetary transmission of claim 34, wherein each of said fluid power cylinders includes resiliently compressed spring means contained in the second end of the cylinder means exerting resilient biasing force on respective piston means in the direction of transmission engagement.

37. The planetary transmission of claim 34, wherein teeth of said sun gear, teeth of said planetary gear means, and said first and second ring gears are straight teeth substantially aligned with the axis of shifting movement of said planetary carrier to facilitate shifting of the transmission between engaged and disengaged states.

38. The planetary transmission of claim 37, wherein said second ring gear includes an annular ring of clutch spline teeth; said housing includes an internal ring of spline teeth; said clutch means has a ring of spline teeth engaging the internal ring of spline teeth of said housing; with said spline teeth straight axially aligned teeth to facilitate axial shifting movement of said clutch means between transmission engaged and disengaged states; and clutch spline teeth on said clutch means engageable and disengageable with the annular ring of clutch spline teeth of said second ring gear.

39. The planetary transmission of claim 38, wherein said transmission housing is rotatably mounted on said power shift means by roller thrust bearing means on a cylindrical portion of said power shift means adjacent said first end of said transmission; said power shift means has a center opening; said sun gear having an input shaft extending through the center opening of said power shift means when assembled in place in the transmission; said sun gear input shaft having a splined section for drive engagement with and support by a splined power shaft; and with the sun gear also supported by meshed engagement with the planetary gear means.

40. The planetary transmission of claim 39, wherein the clutch means is located at the output end of said planetary transmission to disconnect the transmission housing from all of the gearing of said planetary transmission in the drive disengaged state, and permit free wheeling of said transmission housing without rotation of transmission gears.

41. The planetary transmission of claim 1, wherein the clutch means is located at the output end of said planetary transmission to disconnect the transmission housing from all of the gearing of said planetary transmission in the drive disengaged state, and permit free wheeling of said transmission housing without rotation of transmission gears.

* * * * *